US010170061B2

(12) United States Patent
Files et al.

(10) Patent No.: US 10,170,061 B2
(45) Date of Patent: Jan. 1, 2019

(54) BACKLIGHT COMPENSATION FOR A COMPUTING DEVICE WITH TWO OR MORE DISPLAY DEVICES

(71) Applicant: Dell Products L.P., Round Rock, TX (US)

(72) Inventors: Jace W. Files, Round Rock, TX (US); Preeth K. Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 15/364,529

(22) Filed: Nov. 30, 2016

(65) Prior Publication Data
US 2018/0151131 A1    May 31, 2018

(51) Int. Cl.
*G09G 3/34* (2006.01)
*G06F 3/14* (2006.01)

(52) U.S. Cl.
CPC ........... *G09G 3/342* (2013.01); *G06F 3/1423* (2013.01); *G09G 2320/041* (2013.01); *G09G 2320/0626* (2013.01); *G09G 2320/0686* (2013.01); *G09G 2320/08* (2013.01); *G09G 2330/021* (2013.01); *G09G 2356/00* (2013.01); *G09G 2360/144* (2013.01); *G09G 2360/145* (2013.01); *G09G 2360/16* (2013.01)

(58) Field of Classification Search
CPC ............. G09G 3/342; G09G 2360/145; G09G 2320/041; G09G 2330/021; G09G 2360/16; G09G 2360/144; G09G 2320/0626; G06F 3/1423

USPC ................. 345/1.1, 101, 102, 87, 4
See application file for complete search history.

(56) References Cited

U.S. PATENT DOCUMENTS

| 7,567,239 B2 | 7/2009 | Seni ............................ 345/173 |
| 7,796,179 B2 * | 9/2010 | Fujinawa .............. G02F 1/1347 345/102 |
| 8,108,016 B2 | 1/2012 | Gaddy ........................... 16/223 |
| 8,749,484 B2 | 6/2014 | de Paz .......................... 345/156 |

(Continued)

OTHER PUBLICATIONS

Knepper, Lawrence E. et al., "Routing Content in a Dual-Display Computing Device"; U.S. Appl. No. 15/334,503, filed Oct. 26, 2016; consisting of Specification, Claims, Abstract, and Drawings (45 pages).

(Continued)

*Primary Examiner* — Vinh T Lam
(74) *Attorney, Agent, or Firm* — Campbell Stephenson LLP; Shiv S. Naimpally

(57) ABSTRACT

In some implementations, a computing device may include a first display device and a second display device. An embedded controller may determine a first amount of ambient light and a first current associated with the first display device and modify the first current to create a first modified amount of current associated with the first display device. The embedded controller may determine a second amount of ambient light and second current associated with the second display device. The embedded controller may determine a ratio of a first perceived brightness of the first display device to a second perceived brightness of the second display device and modify the second current until the ratio is within a predetermined amount from a target ratio.

20 Claims, 10 Drawing Sheets

(56) References Cited

U.S. PATENT DOCUMENTS

| | | | |
|---|---|---|---|
| 8,801,196 B2 | 8/2014 | Sawada et al. | 353/94 |
| 8,872,731 B2 | 10/2014 | Gimpl | 345/1.3 |
| 8,963,857 B2 | 2/2015 | Kim et al. | 345/173 |
| 9,003,755 B2* | 4/2015 | Chen | G09G 3/006 345/102 |
| 9,013,368 B1 | 4/2015 | Kim et al. | 345/1.1 |
| 9,250,851 B2 | 2/2016 | Lu | |
| 9,286,020 B2* | 3/2016 | Dunn | G06F 3/14 |
| 9,348,497 B2 | 5/2016 | Miyano | 345/173 |
| 9,570,044 B2* | 2/2017 | Fan | G09G 5/10 |
| 2002/0126126 A1 | 9/2002 | Baldwin | 345/557 |
| 2006/0139295 A1* | 6/2006 | Eberhard | G06F 3/147 345/101 |
| 2007/0222742 A1* | 9/2007 | Kimura | G09G 3/3406 345/102 |
| 2008/0094412 A1 | 4/2008 | Jiao | 345/621 |
| 2008/0129712 A1 | 6/2008 | Nguyen | 345/179 |
| 2008/0238336 A1* | 10/2008 | Peng | G09G 3/3426 315/294 |
| 2009/0262079 A1 | 10/2009 | Bury | 356/169 |
| 2012/0081400 A1 | 4/2012 | Schrock | 345/649 |
| 2012/0208092 A1 | 11/2012 | Kummer | 345/173 |
| 2012/0280895 A1* | 11/2012 | Yeh | G02F 1/1323 345/87 |
| 2013/0328878 A1 | 12/2013 | Stahl | 345/428 |
| 2013/0332642 A1 | 12/2013 | Capezza | 710/304 |
| 2013/0342512 A1* | 12/2013 | Smith | G09G 3/3406 345/204 |
| 2014/0092107 A1 | 4/2014 | Ferry | 345/520 |
| 2015/0067489 A1 | 3/2015 | Zotto | 715/268 |
| 2016/0182924 A1 | 6/2016 | Todd | 725/116 |
| 2016/0274722 A1* | 9/2016 | Putzolu | G06F 1/1616 |
| 2016/0321969 A1 | 11/2016 | Kambhatla | |

OTHER PUBLICATIONS

Files, Jace W. et al., "Auto-Scrolling Input in a Dual-Display Computing Device"; U.S. Appl. No. 15/348,119, filed Nov. 10, 2016; consisting of Specification, Claims, Abstract, and Drawings (45 pages).

Siebert, Philip M., et al., "Automatically Modifying an Input Area Based on a Proximity to Oneo More Edges"; U.S. Appl. No. 15/352,826, filed Nov. 16, 2016; consisting of Specification, Claims, Abstract, and Drawings (38 pages).

* cited by examiner

BACKLIGHT COMPENSATION FOR A COMPUTING DEVICE WITH TWO OR MORE DISPLAY DEVICES

BACKGROUND OF THE INVENTION

Field of the Invention

This invention relates generally to a computing device with two or more display devices and, more particularly, to adjusting a backlight of at least one of the two or more display devices to compensate for differences in brightness between the display devices caused by (a) manufacturing, (b) temperature, and (c) ambient lighting.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For a computing device that has two (or more) display devices integrated into the computing device, providing a user with an enjoyable user experience may include providing a backlight brightness for both of the display devices that is perceived by the user as being similar (e.g., nearly identical). For example, the user may have an enjoyable user experience if the user does not perceive one of the display devices as being significantly brighter than the other display device(s), e.g., the user perceives all of the display devices as having a similar brightness.

One issue related to providing a similar perceived brightness for two (or more) display devices is that, while a backlit panel of a display device is capable of being manufactured to have a similar (e.g., consistent) backlight across an individual panel, manufacturing tolerances may result in significant and perceivable brightness differences between two or more panels. For example, brightness may vary up to 20% between display panels produced by the same manufacturing plant.

A second issue associated with providing a similar perceived brightness for two (or more) display devices is that, depending on the orientation of the computing device, the ambient light may vary between the two display devices. For example, a particular display device may be in a location that receives more ambient light than other display devices. The particular display device may appear less bright (e.g., washed out) compared to the other display devices.

A third issue associated with providing a similar perceived brightness for two (or more) display devices is that temperatures may vary among the display devices, thereby causing differences in brightness. For example, a tablet computing device with two display devices may locate the motherboard behind a first display device and locate the battery behind the second display device, causing the temperature of the two display devices to vary during use. The brightness of each display device may vary based in part on the temperature of each display device, causing differences in brightness.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a computing device may include a first display device and a second display device. An embedded controller may determine a first amount of ambient light and a first current associated with the first display device and modify the first current to create a first modified amount of current associated with the first display device. The embedded controller may determine a second amount of ambient light and second current associated with the second display device. The embedded controller may determine a ratio of a first perceived brightness of the first display device to a second perceived brightness of the second display device and modify the second current until the ratio is within a predetermined amount from a target ratio.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
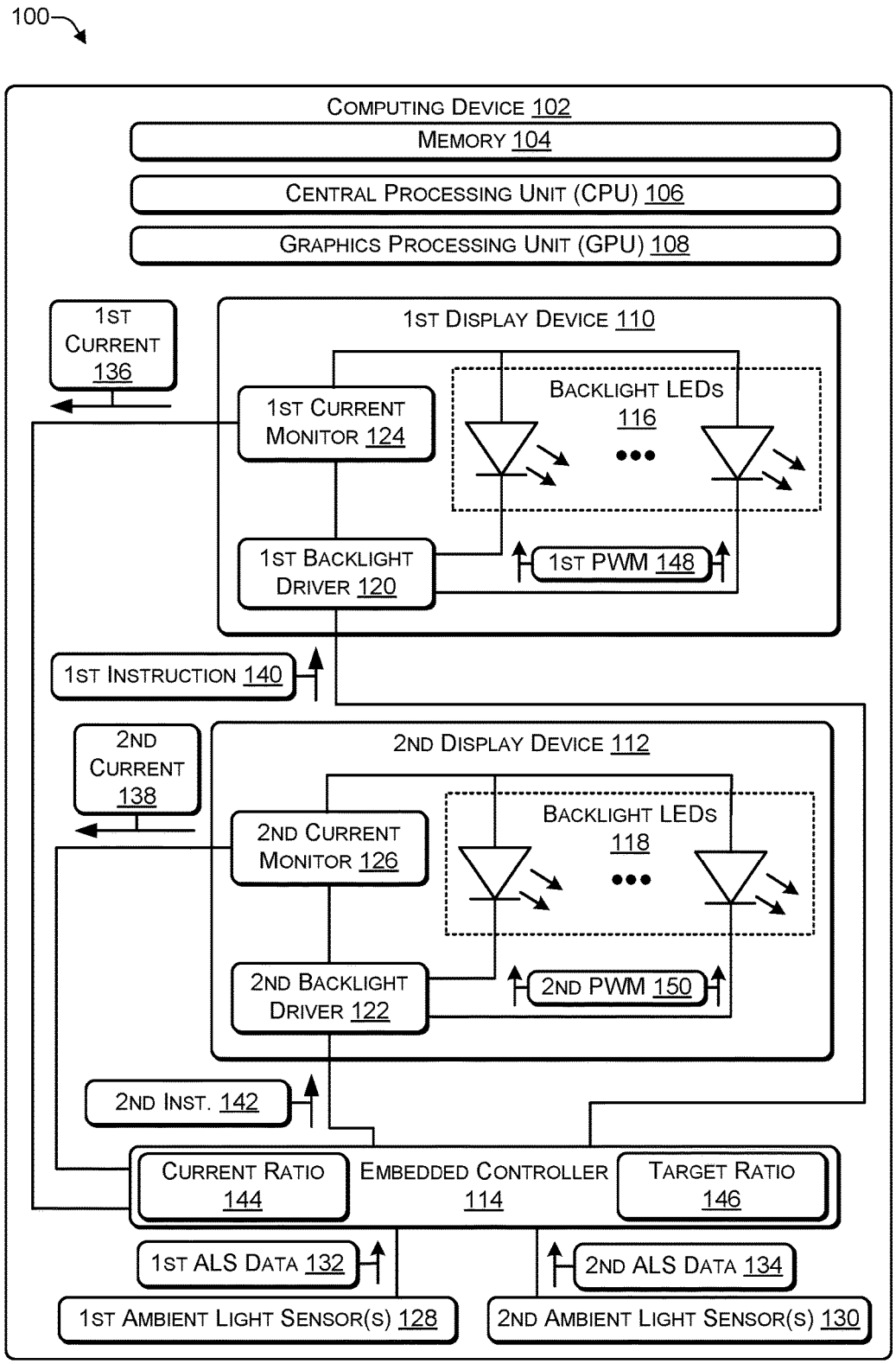
FIG. 1 is a block diagram of an architecture that includes a computing device with two display devices according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The system and techniques described herein may automatically (e.g., without human interaction) adjust the brightness of one or more secondary (e.g., slave) display devices to match (e.g., within a predetermined amount) the brightness of a first (e.g., master) display device. For example, a portable tablet computing device may include at least two display devices, in which a first display device is attached to a second display device that enables the first display device to rotate between approximately zero and approximately three hundred and sixty degrees relative to the second display device. The hinge may be fairly slim, thereby enabling the two display devices to be less than six millimeters apart from each other. In some cases, a single organic light emitting diode (OLED) panel may be folded to create the first display device and the second display device. Due to the close proximity of the two (or more) display devices to each other, adjusting the brightness (e.g., perceived brightness) of the second display to closely match (e.g., approximate) the brightness of the first display may provide the user with a positive user experience when using the multiple display computing device. While a computing device with two display devices for illustration purposes, the techniques and systems may be applied to a computing device with more than two display devices, e.g., a computing device with a primary (master) display device and one or more secondary (slave) display devices.

While the manufacturer of a display panel used in a display device may match and calibrate the brightness of the backlight of each display devices, manufacturing tolerances may enable significant (e.g., perceivable) brightness variations between two or more display panels. For example, the brightness of two display panels manufactured at the same location may vary by as much as between ten and twenty percent. Thus, asking the manufacturer to identify two (or more) display devices with approximately the same brightness may be time consuming, expensive, or both. Additionally, the amount of ambient light associated with each display device may vary based on the orientation and lighting conditions in which the computing device us used. Furthermore, temperature differences between the two (or more) display devices may cause brightness variations between the display devices. For example, different components may be located behind each of the display devices and may cause temperature variations that result in differences in brightness between the display devices.

The techniques and systems described herein may automatically adjust the brightness of one or more secondary display devices to match (e.g., within a predetermined amount) the brightness of a first display device. For example, each display device may have a set of one or more associated ambient light sensors (ALS), one or more brightness measurement sensors, or both. Each set of ALS may measure an amount of ambient light associated with a corresponding display device. Each display device may include a circuit that measures an amount of current being drawn (e.g., used) by one or more light emitting diodes (LEDs) used to provide a backlight to each display device. For example, in some cases, an amount of current used by all of the LEDs of the backlight of each display device may be measured. In other cases, an amount of current used by a portion of the LEDs of the backlight of each display device may be measured. The amount of current used by the portion of the LEDs of the backlight of each display device may be extrapolated to determine the total current draw for each display device. For example, if a display device has a 5×5 ("five by five") LED backlight, e.g., five strings of five LEDs each, the current draw of one string of five LEDs may be measured and multiplied by five to determine the total current draw of the LEDs associated with the display device.

The current draw and ambient light associated with the first display device may be measured and the brightness of the first (e.g., master) display device adjusted to provide a particular (e.g., predetermined) brightness level. The current draw and ambient light associated with each of the one or more secondary display devices may be measured. A ratio of the current draw of the master display device to the current draw of the secondary display device may be calculated. The ratio may be compared with a target ratio and the current associated with the secondary display device may be repeatedly adjusted and the ratio re-calculated until the ratio of the current draw of the master display device to the current draw of the secondary display device is within a predetermined amount of the target ratio.

For example, if the secondary display device is not as bright (e.g., drawing less current, receiving more ambient light, at a higher temperature, or any combination thereof) as compared to the master display device, the amount of current being sent to the backlight LEDs of the secondary display device may be incrementally and repeatedly increased until the brightness of the secondary display device is approximately the same as the brightness of the master display. To illustrate, a duty cycle associated with a pulse width modulation (PWM) circuit that provides current to the backlight LEDs of the secondary display device may be increased to increase a brightness of the secondary display device.

If the secondary display device is brighter (e.g., drawing more current, receiving less ambient light, or at a lower temperature, or any combination thereof) as compared to the master display device, the amount of current being sent to the backlight LEDs of the secondary display device may be incrementally and repeatedly decreased until the brightness of the secondary display device is approximately the same as the brightness of the master display. For example, a duty cycle associated with a PWM circuit that provides current to the backlight LEDs of the secondary display device may be decreased to decrease a brightness of the secondary display device.

Thus, the ambient light associated with a master display device and with a secondary display device may be determined. The current drawn by the backlight LEDs of the secondary display device and the current drawn by the backlight LEDs of the master display device may be determined. A ratio of the brightness of the master display device to the secondary display device may be calculated. The brightness of the secondary display device may be repeatedly and incrementally adjusted by adjusting an amount of current provided to the secondary display device until the ratio is within a threshold amount of a target ratio. Thus, the brightness of the secondary display device may be adjusted to be nearly the same (e.g., within a predetermined amount of brightness) of the master display device. In this way, the computing device may automatically compensate for manufacturing variations that cause differing brightness levels between the backlight of the secondary display device and the backlight of the master display device. Further, the computing device may automatically compensate for perceived differences in brightness between the secondary display device and the master display device due to differences in ambient light between the two display devices. In addition, the computing device may automatically compensate for differences in brightness between the secondary display device and the master display device due to changes in a temperature of the secondary display device and a temperature of the master display device.

FIG. 1 is a block diagram of an architecture 100 that includes a computing device with two display devices according to some embodiments. A computing device 102 may include a memory 104, a central processing unit (CPU) 106, and a graphics processing unit (GPU) 108. The GPU 108 may be a separate device (e.g., integrated circuit) from the CPU 106 or may be integrated into the CPU 106.

The computing device 102 may include at least a first display device 110 and a second display device 112. The display devices 110, 112 may each be touch-sensitive display devices that are capable of receiving input from a stylus or an appendage (e.g., finger).

An embedded controller 114 may monitor various parameters associated with the display devices 110, 112 and adjust a brightness of one of the display devices 110, 112 such that the perceived brightness of the display devices 110, 112 is approximately the same when the display devices are being viewed together. For example, one of the display devices, such as the first display device 110, may be configured as a master display device and another of the display devices, such as the second display device 112, may be configured as a secondary display device. Of course, in some cases, the first display device 110, may be configured as the secondary display device and the second display device 112 may be configured as the master display device. The embedded controller 114 may monitor parameters, such as current and ambient light, associated with each of the display devices and compare a brightness of the secondary display device to the brightness of the primary display device. The embedded controller 114 may adjust the brightness of the secondary display device to appear approximately the same as (e.g., within a predetermined amount of) the brightness of the primary display device.

The first display device 110 may include a first set of backlight light emitting diodes (LEDs) 116 and the second display device 112 may include a second set of backlight light emitting diodes (LEDs) 118. For example, if each of the display devices 110, 112 is approximately 4.5"×5.5", each set of backlight LEDs 116, 118 may include 5 strings of 5 LEDs=25 LEDs. Of course, the number of LEDs in each of the backlight LEDs 116, 118 may vary (e.g., more than 25 or less than 25) depending on the implementation.

The first display device 110 may include a first backlight driver 120 to drive (e.g., cause to illuminate) the backlight LEDS 116. The second display device 112 may include a second backlight driver 122 to drive the backlight LEDS 118. A first current monitor 124 may monitor an amount of current being drawn (e.g., used) by at least a portion of the backlight LEDs 116. In some cases, the first current monitor 124 may monitor a portion of the backlight LEDs 116 and the amount of current draw that is measured may be extrapolated to determine the total current draw of the backlight LEDs 116. For example, if the backlight LEDs 116 include 5 strings, with each string having 5 LEDs, the first current monitor 124 may measure the current draw of one string of 5 LEDs and the measured current draw multiplied by 5 to determine the total current draw of the backlight LEDs 116. In other cases, the first current monitor 124 may monitor a current draw of all the backlight LEDs 116. A second current monitor 126 may monitor an amount of current being drawn (e.g., used) by one or more of the backlight LEDs 118.

The computing device 102 may include a first set (e.g., one or more) of ambient light sensors (ALS) 128 to measure ambient light associated with the first display device 110 and a second set of ALS 130 to measure ambient light associated with the second display device 112. The ALS 128, 130 may include sensors that measure ambient light, sensors that measure a brightness of the LEDs 116, 118, respectively, or both. The embedded controller 114 may read first ALS data 132 that measures an amount of ambient light associated with the first display device 110 and may read second ALS data 134 that measures an amount of ambient light associated with the second display device 112.

The embedded controller 114 may determine first current 136 from the first current monitor 124. The first current 136 may indicate an amount of current being used by at least a portion of the backlight LEDs 116. The embedded controller 114 may determine second current 138 from the second current monitor 126. The second current 138 may indicate an amount of current being used by at least a portion of the backlight LEDs 118.

The embedded controller 114 may determine (1) the ALS data 132, 134 and (2) the current 136, 138. Based on this information, the embedded controller 114 may determine whether (and by how much) to modify the brightness of at least one of the display devices 110, 112. For example, if the ALS data 132 indicates that the first display device 110 is in bright sunlight (e.g., causing the first display device 110 to appear washed out) and the ALS data 134 indicates that the second display device 112 is in shade, the embedded controller 114 may adjust (e.g., increase or decrease) a brightness of the first display device 110 by providing a first instruction 140 to the first backlight driver 120 to adjust (e.g., increase or decrease) the brightness of the backlight LEDs 116. The first instruction 140 may cause the first backlight driver 120 to adjust a first pulse width modulation (PWM) 148 (e.g., adjusting a duty cycle of a square wave) associated with a current being supplied to the backlight LEDs 116 by the first backlight driver 120. For example, the duty cycle of the PWM 148 may be increased to increase the amount of current being sent to the backlight LEDs 116 to increase a brightness of the backlight LEDs 116. As another example, the duty cycle of the PWM 148 may be decreased to decrease the amount of current being sent to the backlight LEDs 116 to decrease the brightness of the backlight LEDs 116.

The embedded controller 114 may determine the second ALS data 132 and the second current 138 and determine a current ratio 144 of the second current 138 to the first current 136. The current ratio 144 may indicate a relative brightness of the second display device 112 to the first display device 110. The embedded controller 114 may compare the current ratio 144 to a target ratio 146. If the current ratio 144 differs from the target ratio 146 by more than a predetermined amount, the embedded controller 114 may repeatedly (1) incrementally adjust (e.g., increase or decrease) the brightness of the second display device 112, (2) measure the second current 138, (3) re-calculate the current ratio 144, and (4) compare the current ratio 144 to the target ratio 146, until the current ratio 144 differs from the target ratio 146 by no more than the predetermined amount.

To adjust the brightness of the second display device 112, the embedded controller 114 may provide a second instruction 142 to the second backlight driver 122. For example, the second instruction 142 may cause the second backlight driver 122 to perform a PWM 150 that adjusts a duty cycle of a square wave supplying current to the backlight LEDs 118. To illustrate, the duty cycle of the PWM 150 may be increased to increase the amount of current being sent to the backlight LEDs 118 to increase a brightness of the backlight LEDs 118. The duty cycle of the PWM 150 may be decreased to decrease the amount of current being sent to the backlight LEDs 118 to decrease a brightness of the backlight LEDs 118. In some cases, the instructions 140, 142 may be sent via an inter-integrated circuit (I2C) or other similar bus.

Thus, the embedded controller 114 may adjust a brightness of the master display device and adjust a brightness of the secondary display device(s) to match (e.g., within a predetermined amount) the brightness of the master display. For example, the embedded controller 114 may determine the ALS data 132 and the first current 136. The embedded controller 114 may determine whether to adjust the brightness of the backlight LEDs 116. For example, if the ALS data 132 indicates that the first display device 110 is receiving a relatively small amount of ambient light (e.g., shade), the embedded controller 114 may increase the brightness of the backlight LEDs 116 by sending the first instruction 140 to the first backlight driver 120 to increase the square wave duty cycle of the first PWM 148. If the ALS data 132 indicates that the first display device 110 is receiving a relatively large amount of ambient light (e.g., bright sunlight or underneath a lamp), the embedded controller 114 may decrease the brightness of the backlight LEDs 116 by sending the first instruction 140 to the first backlight driver 120 to decrease the square wave duty cycle of the first PWM 148.

After adjusting the first (e.g., master) display device 110, the embedded controller 114 may adjust the brightness of one (or more) secondary display devices, such as the representative secondary display device 112, to match the brightness of the first display device 110. For example, the embedded controller 114 may determine the second ALS data 134 from the second ambient light sensor(s) 130. The embedded controller 114 may determine the second current 138 associated with the second display device 112. The embedded controller 114 may determine the current ratio 144 of the first current 136 to the second current 138 and may compare the current ratio 144 to the target ratio 146. In response to determining that the current ratio 144 differs from the target ratio 146 by more than a predetermined amount, the embedded controller 114 may send the second instruction 142 to the second backlight driver 122 to adjust the second PWM 150 (e.g., by adjusting the duty cycle of a square wave). For example, if the current ratio 144 (e.g., and based on the second ALS data 134) indicates that the backlight LEDs 118 may appear less bright than the backlight LEDs 116, the embedded controller 114 may increase the brightness of the backlight LEDs 118 by sending the second instruction 142 to the second backlight driver 122 to increase the square wave duty cycle of the second PWM 150. If the current ratio 144 (e.g., and based on the second ALS data 134) indicates that the backlight LEDs 118 may appear more bright than the backlight LEDs 116, the embedded controller 114 may decrease the brightness of the backlight LEDs 118 by sending the second instruction 142 to the second backlight driver 122 to decrease the square wave duty cycle of the second PWM 150. The embedded controller 114 may determine the second current 138 associated with the second display device 112, determine the current ratio 144 of the second current 138 to the first current 136, and compare the current ratio 144 to the target ratio 146. If the current ratio 144 differs from the target ratio 146 by more than the predetermined amount, the embedded controller 114 may send the second instruction 142 to the second backlight driver 122 to adjust the second PWM 150 (e.g., by adjusting the duty cycle of a square wave). This process of measuring the second current 138, determining the current ratio 144 to the target ratio 146, and adjusting the second PWM 150 may be repeated until the current ratio 144 differs from the target ratio 146 by no more than (or less than) the predetermined amount, e.g., indicating that the second display device 112 has a brightness that is approximately the same brightness as the first display device 110. Thus, the brightness of the backlight LEDs 118 may be incrementally and repeatedly adjusted until the brightness of the backlight LEDs 116, 118 is perceived to be about the same, e.g., based on the ambient lighting associated with the display devices 110, 112.

Figure 2:
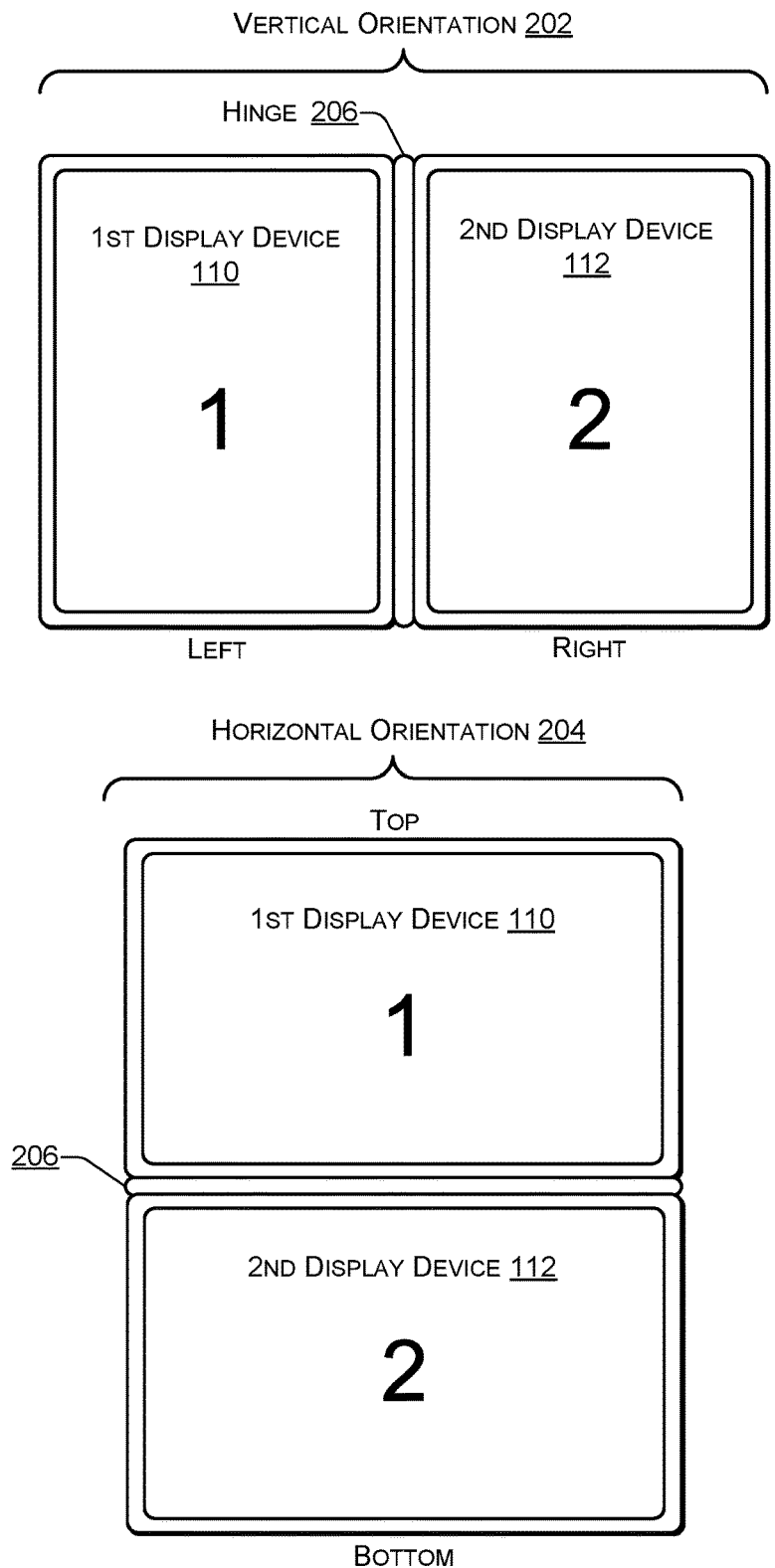
FIG. 2 is a block diagram illustrating different orientations of a dual-screen device according to some embodiments.
Figure 3:
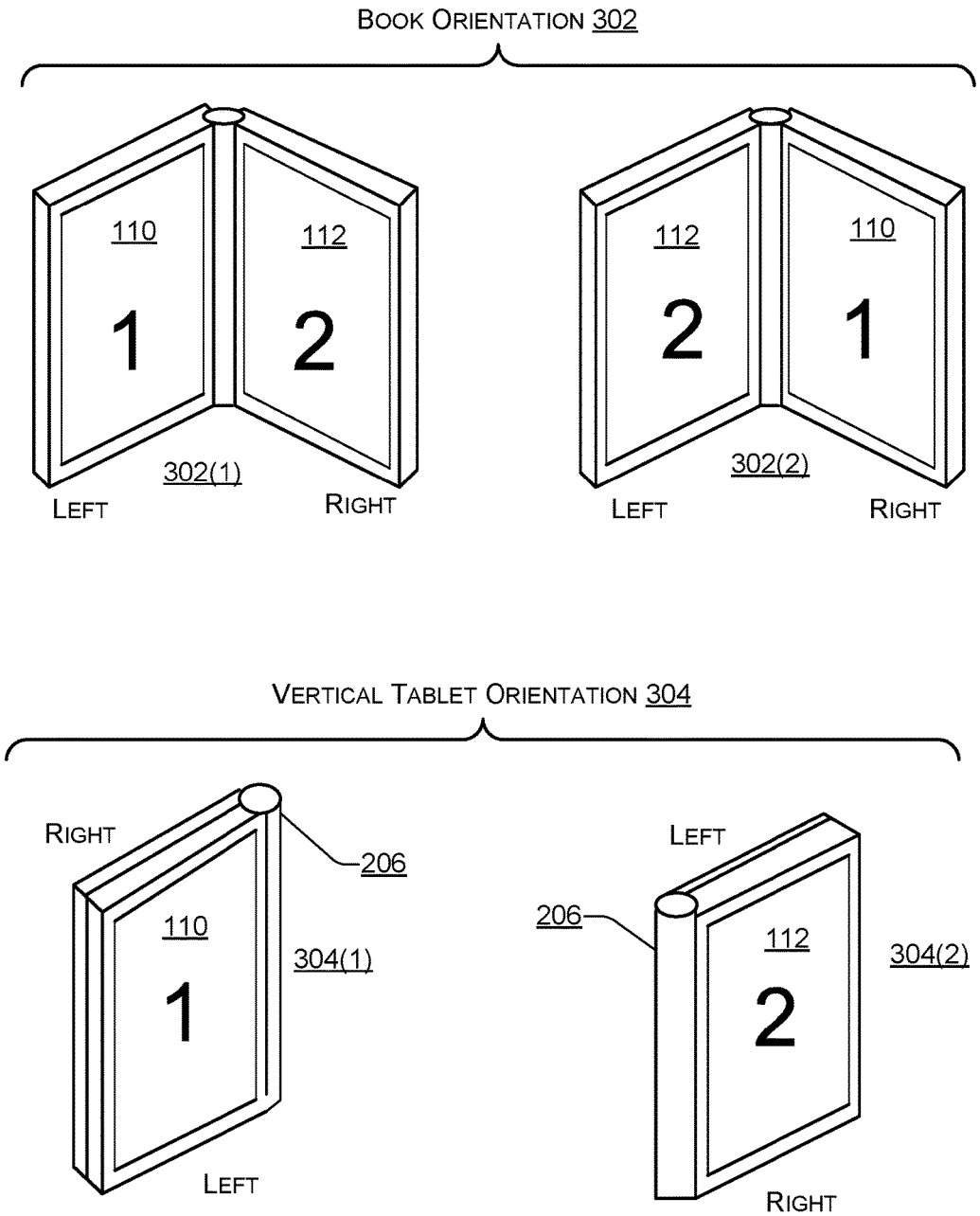
FIG. 3 is a block diagram illustrating modes of a dual-screen device in a vertical orientation according to some embodiments.

FIG. 2 is a block diagram 200 illustrating different orientations of a dual-screen device (e.g., the computing device 102 of FIG. 1) according to some embodiments. The computing device 102 may include at least two display devices 110, 112. The computing device 102 may be displayed in a vertical (e.g., portrait) orientation 202 or a horizontal (e.g., landscape) orientation 204. For example, in the vertical orientation 202, the first display device 110 may be on one side (e.g., the left side or the right side), the second display device 112 may be on another side (e.g., the right side or the left side), and a hinge 206 may join the first display device 110 to the second display device 112. Additional examples of the vertical orientation 202 are illustrated in FIG. 3. In the horizontal orientation 204, the first display device 110 may be located at the top (or the bottom) of the computing device 102 with the hinge 206 in the middle and the second display device 112 may be located at the bottom (or the top) of the computing device 102. Additional examples of the horizontal orientation 204 are illustrated in FIG. 4.

FIG. 3 is a block diagram 300 illustrating additional vertical orientations of a dual-screen device according to some embodiments. Additional examples of the vertical orientation 202 may include a book orientation 302 and a vertical tablet orientation 304. For example, in a first book orientation 302(1), the first display device 110 may be on the left and the second display device 112 may be on the right. Alternately, in a second book orientation 302(2), the second display device 112 may be on the left and the first display device 110 may be on the right.

In the vertical tablet orientation 304, the first display device 110 may be on the left and the second display device 112 may be on the right. In a first vertical tablet orientation 304(1), the first display device 110 may be facing a user and the second display device 112 may be rotated approximately 360 degrees to face away from the user. In a second vertical tablet orientation 304(2), the second display device 112 may be facing the user while the first display device 110 may rotated approximately 360 degrees to face away from the user.

Figure 4:
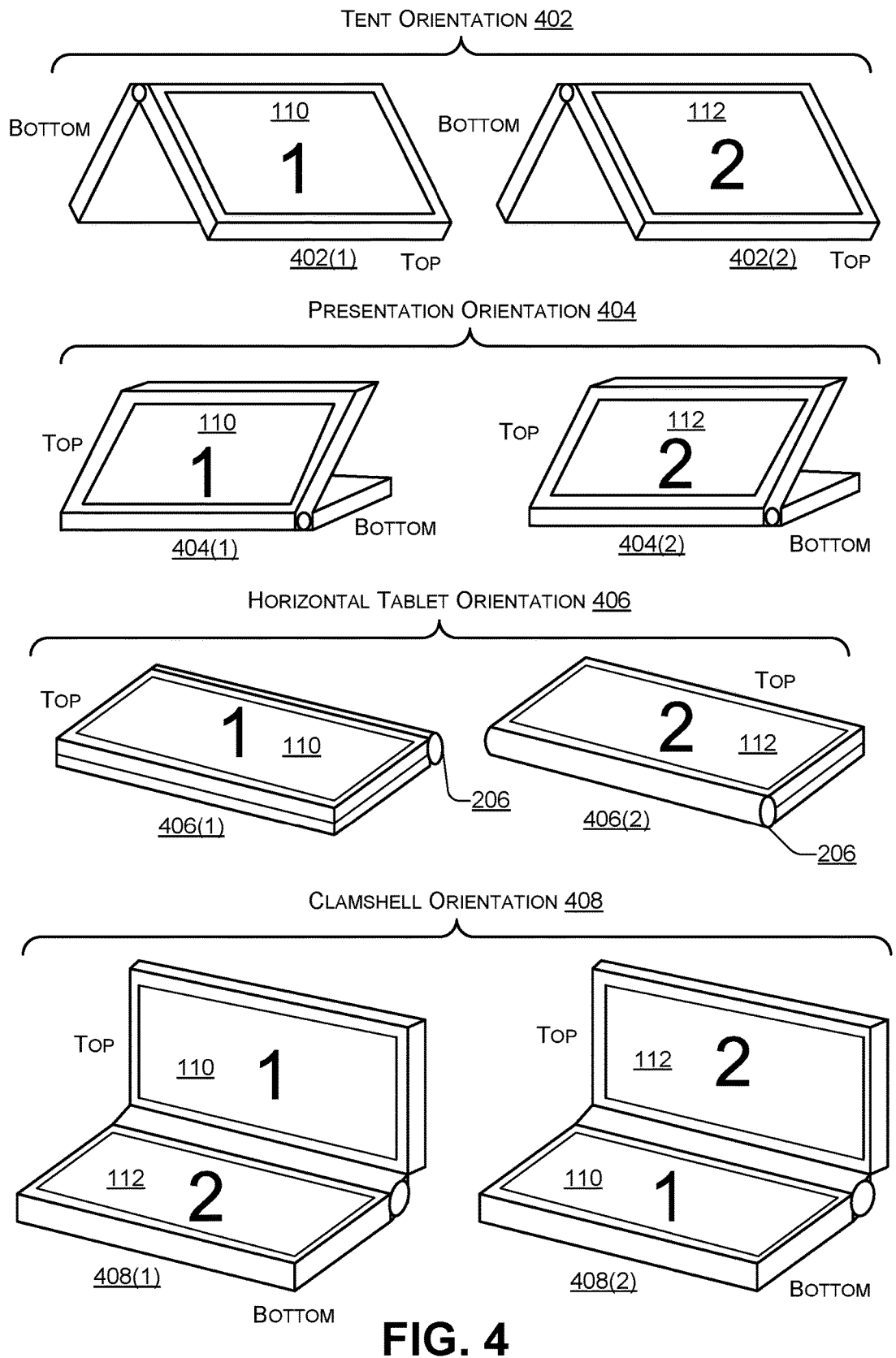
FIG. 4 is a block diagram illustrating modes of a dual-screen device in a horizontal orientation according to some embodiments.

FIG. 4 is a block diagram 400 illustrating additional horizontal orientations of a dual-screen device according to some embodiments. Additional examples of the horizontal orientation 204 may include a tent orientation 402, a presentation orientation 404, a horizontal tablet orientation 406, and a clamshell orientation 408.

In 402(1), the first display device 110 may be at the top facing the user while the second display device 112 may be at the bottom facing away from the user. In 402(2), the second display device 112 may be at the top facing the user and the first display device 110 may be at the bottom facing away from the user.

In 404(1), the first display device 110 may be at the top facing the user and the second display device 112 may be at the bottom facing down. In 404(2) the second display device 112 may be at the top facing the user and the first display device 110 may be at the bottom facing down.

In 406(1), the first display device 110 may be at the top facing the user and the second display device 112 may be at the bottom facing down (e.g., away from the user). In 406(2), the second display device 112 may be at the top facing the user and the first display device 110 may be at the bottom facing down (e.g., away from the user).

In 408(1), the first display device 110 may be at the top facing the user and the second display device 112 may be at the bottom facing the user (e.g., in a position where traditionally, a keyboard is located in a laptop). In 408(1), in some cases, a QWERTY-based keyboard may be displayed on the second display device 112 and used to receive keyboard input. In 408(2), the second display device 112 may be at the top facing the user and the first display device 110 may be at the bottom facing the user (e.g., in a position where traditionally, a keyboard is located in a laptop). In 408(2), in some cases, a QWERTY-based keyboard may be displayed on the first display device 110 and used to receive keyboard input.

Figure 5:
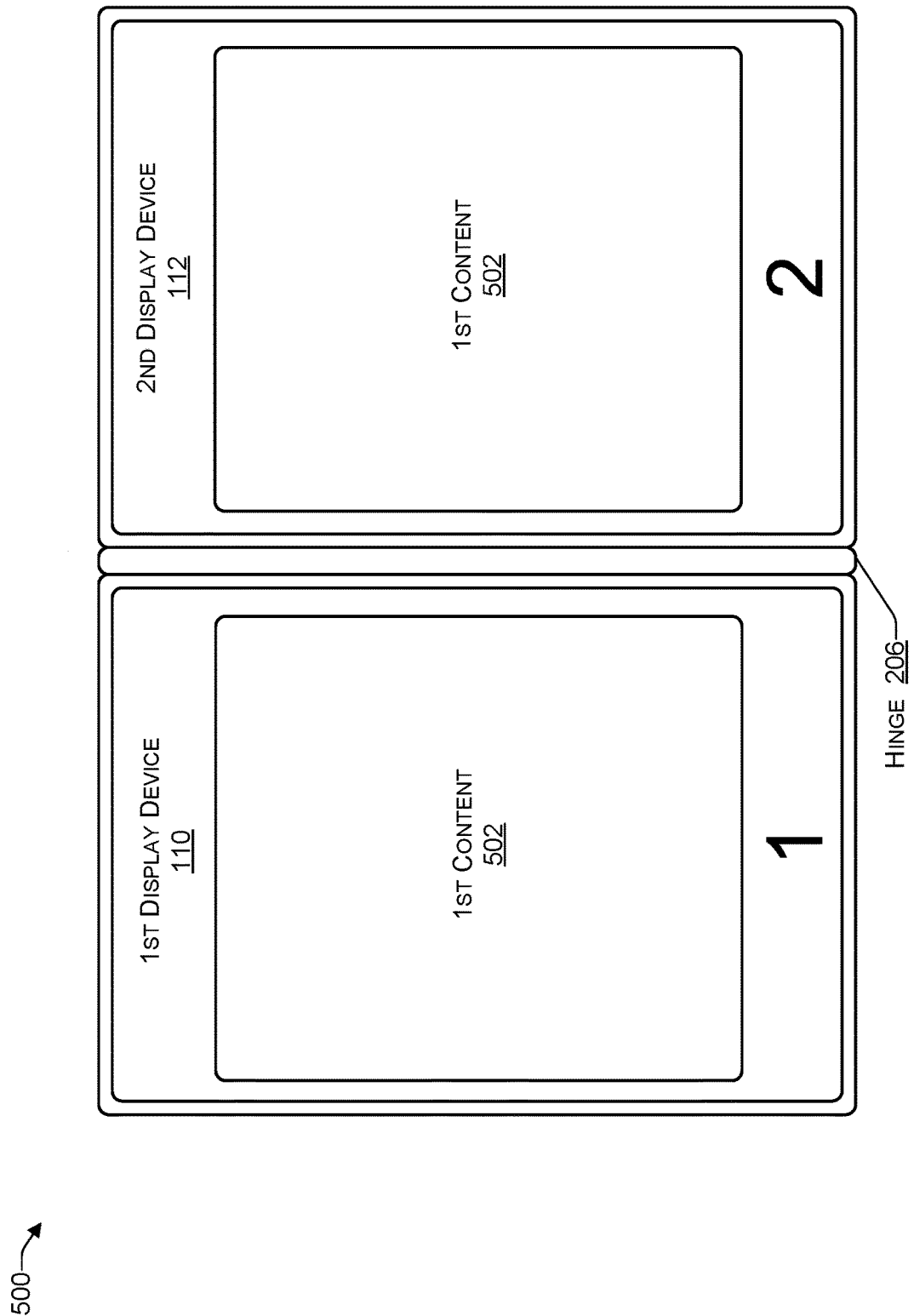
FIG. 5 is a block diagram illustrating a dual-screen device in which the operating system is in a clone mode according to some embodiments.

FIG. 5 is a block diagram 500 illustrating a dual-screen device in which the operating system is in a clone mode according to some embodiments. An operating system of the computing device 102, such as Microsoft® Windows®, may provide three display modes: (a) an extended desktop mode in which the display devices 110, 112 behave as if they were a single display device, with the display device 112 behaving as an extension of the display device 110 (b) a clone mode in which each of the display devices 110, 112 display the same content, or (c) a single display mode, e.g., one of the display devices 110, 112 displays content while the other display device is off (or blank) and does not display content. For example, single display mode may be used when the computing device is in a tablet orientation to turn off a particular display device (of the display devices 110, 112) that is not facing the user or not visible to the user.

In the clone mode, first content 502 may be displayed on the first display device 110. The first content 502 may also be displayed on the second display device 112. Thus, the same content 502 may be displayed on both display devices 110, 112.

Figure 6:
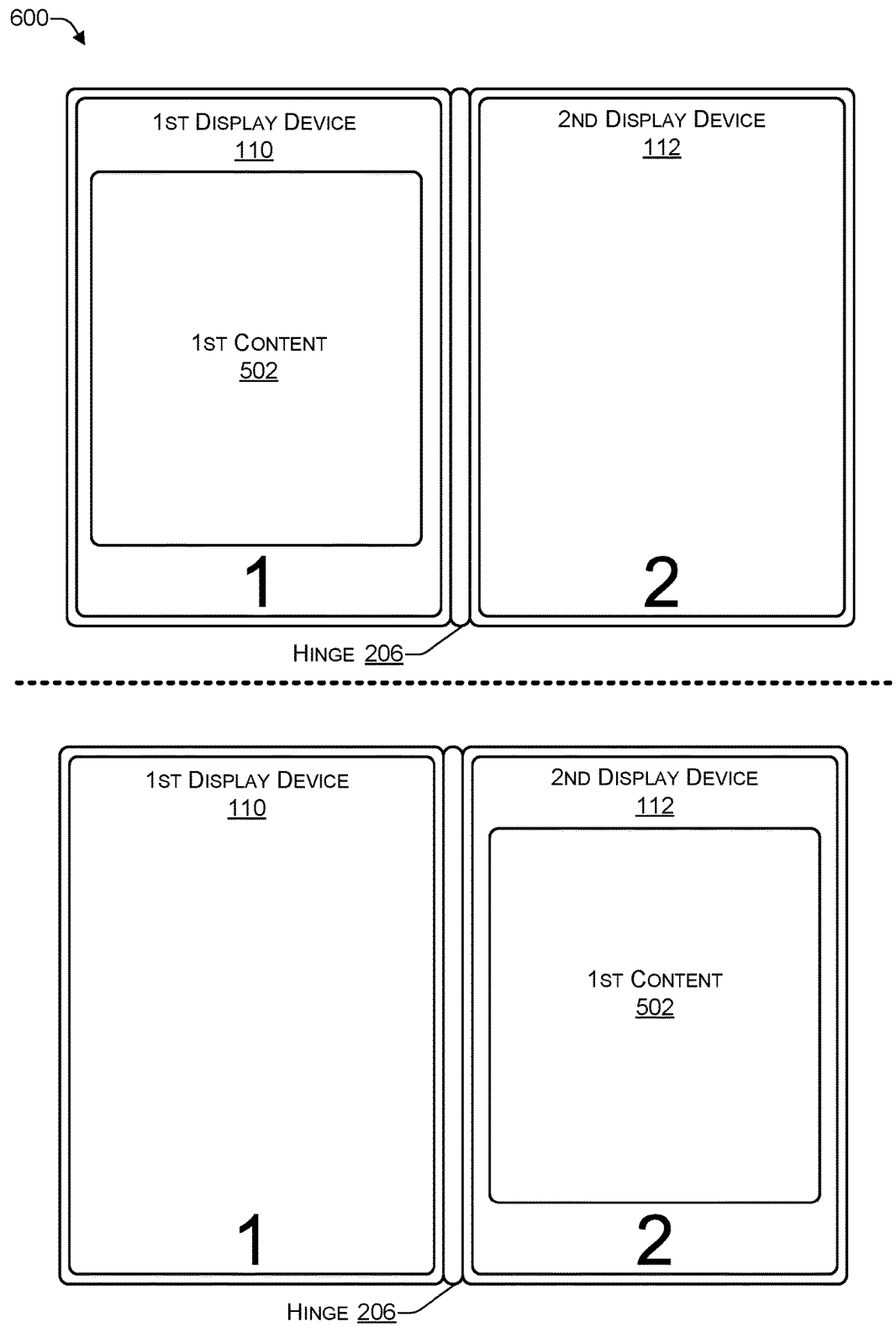
FIG. 6 is a block diagram illustrating a dual-screen device in which the operating system is in a single display mode according to some embodiments.

FIG. 6 is a block diagram 600 illustrating a dual-screen device in which the operating system is in a single display mode according to some embodiments. When an operating system of the computing device 102 of FIG. 1 is in the single display mode, the first content 502 may be displayed on either (but not both) of the first display device 110 or the second display device 112. For example, the first content 502 may be displayed on the first display device 110 and the second display device 112 may not display any content (e.g., the second display device 112 may be blank or off), as illustrated in the top of FIG. 6. As another example, the first content 502 may be displayed on the second display device 112 and the first display device 110 may not display any content (e.g., the second display device 112 may be blank or off), as illustrated in the bottom of FIG. 6.

Figure 7:
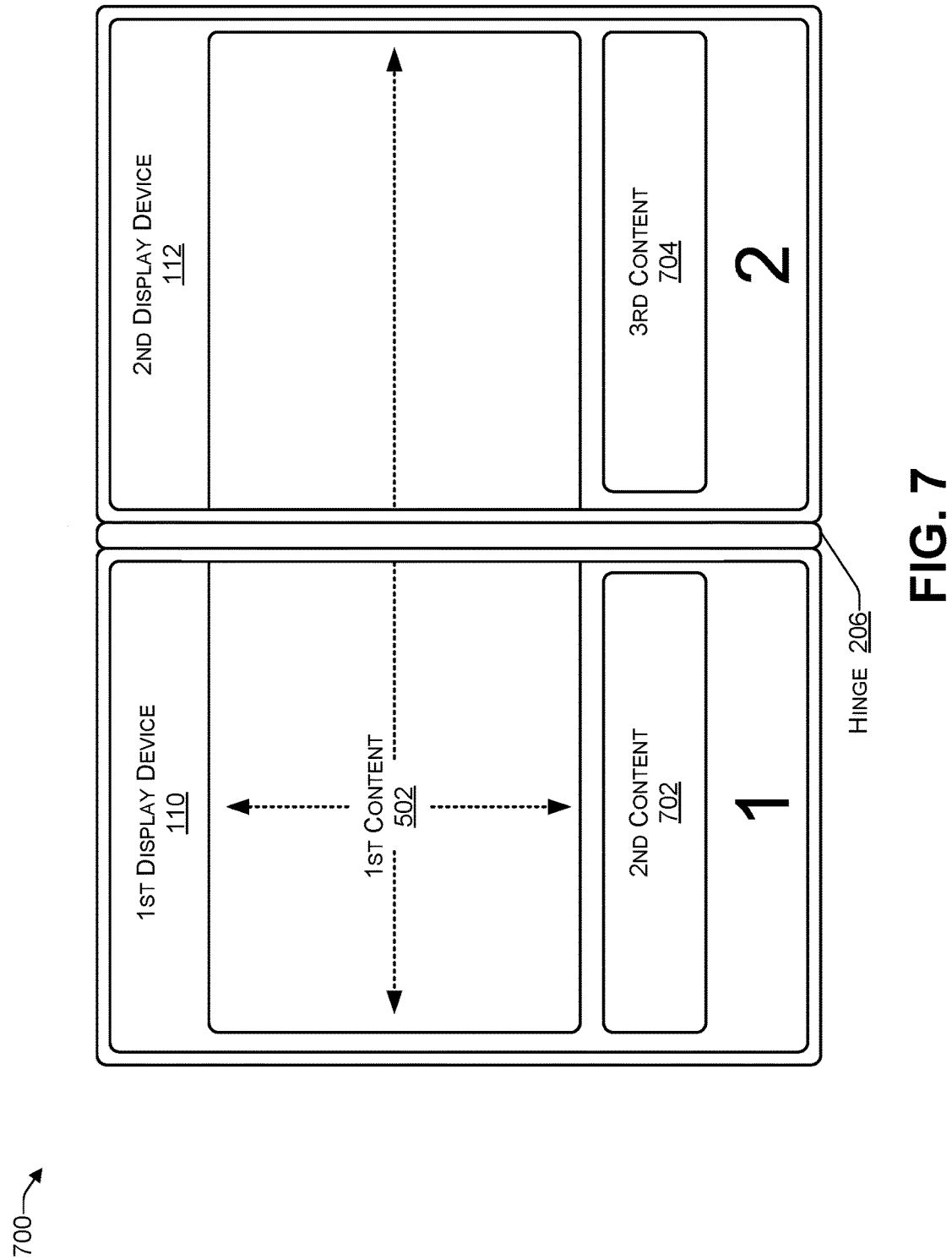
FIG. 7 is a block diagram illustrating a dual-screen device in which the operating system is in an extended display mode according to some embodiments.

FIG. 7 is a block diagram 700 illustrating a dual-screen device in which the operating system is in an extended display mode according to some embodiments. When the operating system of the computing device 102 of FIG. 1 is in the extended display mode, some content, such as the first content 502, may be displayed across both the first display device 110 and the second display device 112. In some cases, additional content may be displayed on either the first display device 110 or the second display device 112. For example, second content 702 may be displayed on the first display device 110 and third content 704 may be displayed on the second display device 112.

Figure 8:
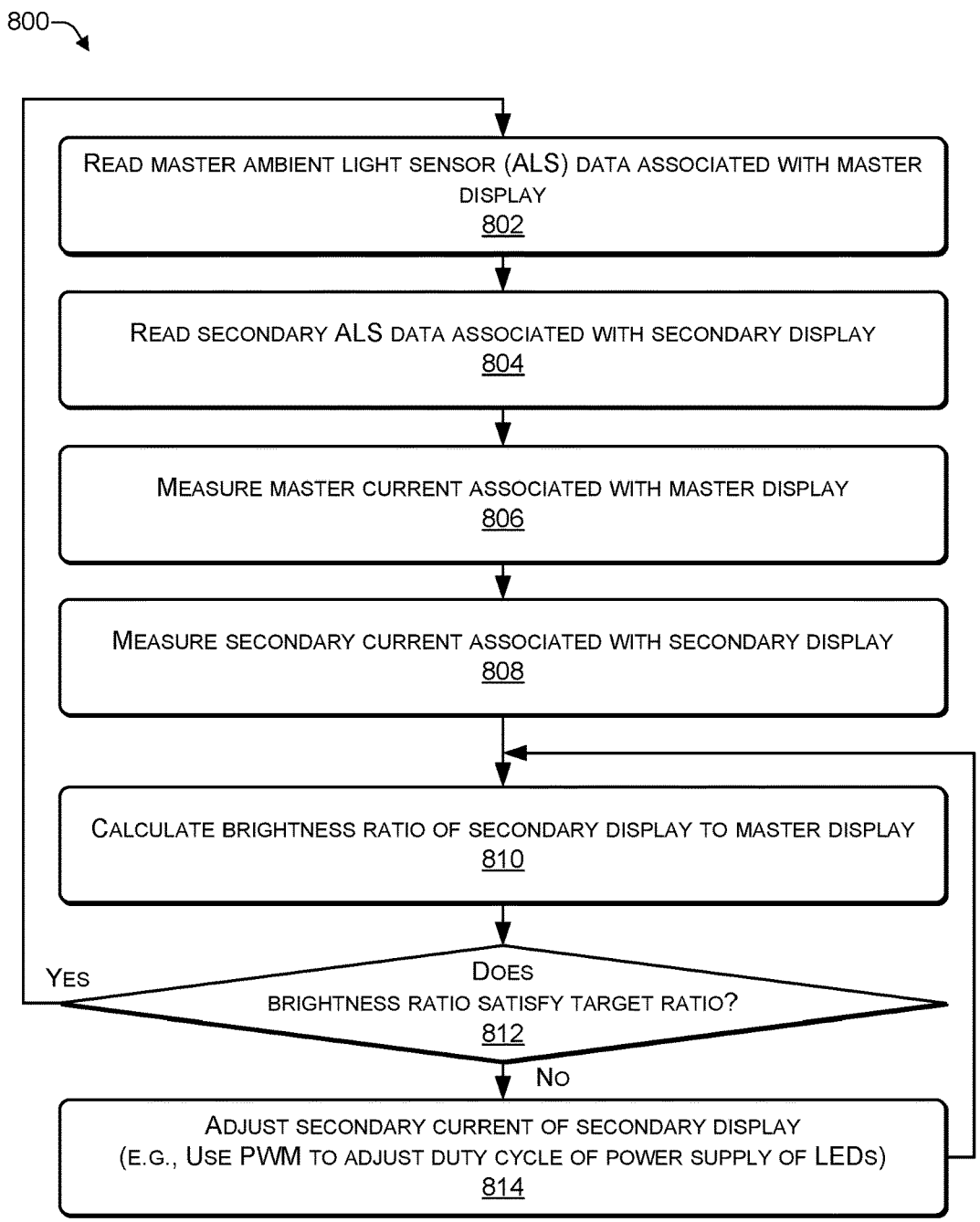
FIG. 8 is a flowchart of a process that includes reading an ambient light sensor (ALS) associated with a display device according to some embodiments.
Figure 9:
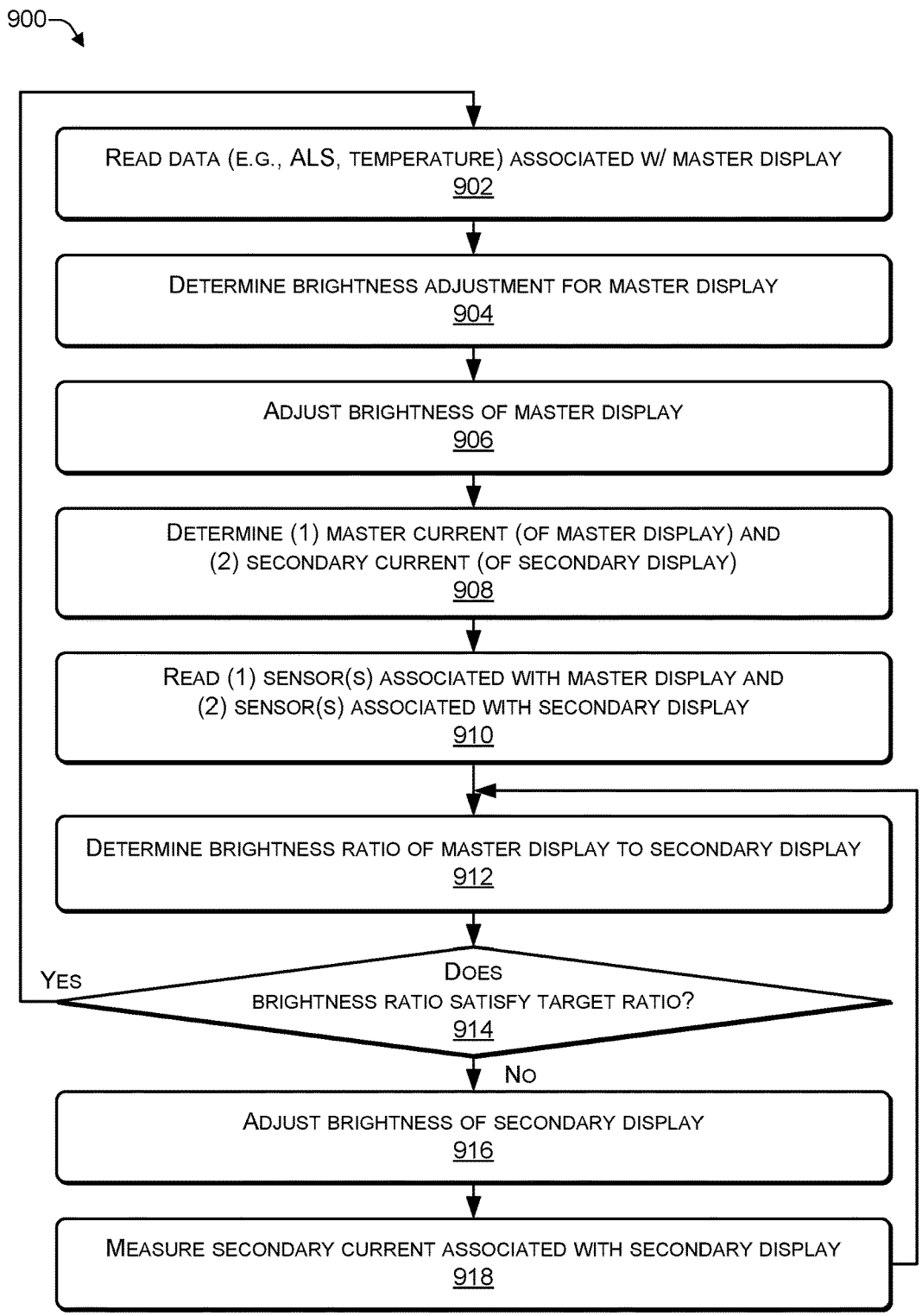
FIG. 9 is a flowchart of a process that includes determining a brightness ratio of two display devices according to some embodiments.

In the flow diagrams of FIGS. 8 and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800 and 900 are described with reference to FIG. 1, 2, 3, 4, 5, 6, or 7 as described above, although other models, frameworks, systems and environments may be used to implement these processes.

FIG. 8 is a flowchart of a process 800 that includes reading an ambient light sensor (ALS) associated with a display device according to some embodiments. The process 800 may be performed by one or more components, such as the embedded controller 114, of the computing device 102 of FIG. 1.

At 802, master ALS data associated with a master display device may be read. At 804, secondary ALS data associated with a secondary display may be read. For example, in FIG. 1, the embedded controller 114 may read the first ALS data 132 from the first ambient light sensor 128 associated with the first display device 110 and may read the second ALS data 134 from the second ambient light sensor 130 associated with the second display device 112.

At 806, a master current associated with the master display device may be measured. At 808, a secondary current associated with the secondary display device may be measured. For example, in FIG. 1, the embedded controller 114 may use the first current monitoring circuit 124 to determine the first current 136 associated with the first display device 110. The embedded controller 114 may use the second current monitoring circuit 126 to determine the second current 138 associated with the second display device 112.

At 810, a brightness ratio identifying the brightness of the master display device relative to the brightness of the secondary display device may be calculated. There are several different ways in which this may be calculated. For example:

$$\text{Master\_to\_Slave\_Ratio} = (\text{Current}_{Master} \times \text{ALS\_Adj}_{Master}) / (\text{Current}_{Slave} \times \text{ALS\_Adj}_{Slave})$$

Where:
Master_to_Slave_Ratio=current ratio 144
$\text{Current}_{Master}$=First Current 136,
$\text{Current}_{Slave}$=Second Current 138,
$\text{ALS\_Adj}_{Master}$=an adjustment for ambient light based on first ALS Data 132, and
$\text{ALS\_Adj}_{Slave}$=an adjustment for ambient light based on second ALS Data 134.

The ALS_Adj (ALS adjustment) may take into account that current may be higher when the ALS data for a display device is relatively high (e.g., more current means a brighter backlight when there is a greater amount of ambient light), and the current for a display device may be lower when ALS data is relatively low (e.g., less current means a dimmer backlight when there is a lower amount of ambient light). For example, assume the current 136, 138 can range (or can be scaled to range) between 0 and 100 milliamperes (mA), the ALS data 132, 134 is measured and scaled to have a value between 0 (minimum ambient light, e.g., darkness) and 100 (maximum ambient light, e.g., direct sunlight). Assume both display devices 110, 112 are set to the same brightness (e.g., without taking into account ambient light), e.g., first current 136=50 mA=second current 138. Assume that the computing device 102 is placed in the clamshell orientation 408(1), with the first display 110 receiving more ambient light than the second display 112, e.g., the ALS data 132=60 and ALS data 134=40. Assume the ALS adjustment=(100−ALS Data). The embedded controller 114 may determine:

$$\text{Master\_to\_slave\_ratio} = (50 \times (100-60))/(50 \times (100-40)) = 2000/3000 = 0.67$$

The above indicates that the first (e.g., master) display device 110 appears less bright than the second display device 112 because the first display 110 is receiving more ambient light than the second display 112. The embedded controller 114 may first adjust the first display device 110 to account for the ambient light (e.g., the first ALS data 132). For example, the embedded controller 114 may use a formula to increase the first current 136 to achieve a target brightness of the first display device 110 based on the ambient light (the first ALS data 132), e.g., first current 136×(100−first ALS data)>=N, where N=2800. Assume the embedded controller 114 increases the first current 136 from 50 to 70 to compensate for the higher ambient light:

$$\text{Master\_to\_slave\_ratio} = (70 \times (100-60))/(50 \times (100-40)) = 2800/3000 = 0.93$$

The embedded controller 114 may adjust the second PWM 150 until the brightness of the backlight LEDs 118, under the corresponding ambient light (e.g. as measured by the second ALS data 134), is within a threshold of the brightness of the backlight LEDs 116, under the corresponding ambient light (e.g. as measured by the first ALS data 132). For example, the embedded controller 114 may repeatedly decrease the second current 138 from 50 to 47 (e.g., decrement by 1 from 50 to 49, from 49 to 48, and from 48 to 47) to reach within a threshold of the target ratio 146:

$$\text{Master\_to\_slave\_ratio} = (70 \times (100-60))/(47 \times (100-40)) = 2800/2820 = 0.99$$

Thus, the embedded controller 114 adjusts the current ratio 144 to be within 1% of the target ratio 146.

At 812, a determination may be made whether the brightness ratio satisfies a target ratio. In response to determining, at 812, that "yes" the brightness ratio satisfies (e.g., is within a predetermined amount of) the target ratio, the process proceeds to 802, where the master ALS sensor data is read. For example, the embedded controller 114 may calculate the current ratio 144 based on the ALS data 132, 134 and the current 136, 138. The embedded controller 114 may compare the current ratio 144 to the target ratio 146 to determine if the perceived brightness (e.g., based on the ambient light) of the display devices 110, 112 is approximately the same. The embedded controller 114 may determine whether the ratio of the master display brightness to the secondary display brightness is within a predetermined amount (or within a predetermined percentage) of the target ratio 146. For example, if the target ratio is 1 ("one") to achieve a perceived equal brightness between the display devices 110, 112, the embedded controller 114 may determine whether the current ratio 144 (master_to_slave ratio) is between 0.98 and 1.02 to determine if the current ratio 144 is within 0.02 (e.g., 2%) of the target ratio 146. The embedded controller 114 may determine whether the current ratio 144 (master_to_slave ratio) is between 0.95 and 1.05 to determine if the current ratio 144 is within 0.05 (e.g., 5%) of the target ratio 146. If the computing device includes more than two display devices, the ratio of the master display device to each secondary display device may be determined and the current of each secondary display device adjusted to match the brightness of each secondary display device to the master display device.

In response to determining, at 814, that "no" the brightness ratio does not satisfy (e.g., is not within a predetermined amount of) the target ratio, the process proceeds to 814, where the secondary current associated with the secondary display device is adjusted. The process 800 then proceeds to 810 where the brightness ratio is re-calculated. The process 800 may repeat 810, 812, and 814 until, at 812, the brightness ratio is determined to satisfy (e.g., is within a predetermined amount of) the target ratio. For example, if the current ratio is 1.10, indicating that the first display device 110 is about 10% brighter than the second display device 112, the embedded controller 114 may repeatedly and incrementally (e.g., by 0.01) increase the second PWM 150 to increase the second current 138 until the current ratio 144 is 1.02 (e.g., within 2% of the target ratio 146) or 1.05 (e.g., within 5% of the target ratio 146). If the current ratio is 0.90, indicating that the first display device 110 is about 90% as bright as the second display device 112, the embedded controller 114 may repeatedly and incrementally (e.g., by 0.01) decrease the second PWM 150 to decrease the second current 138 until the current ratio 144 is 0.98 (e.g., within 2% of the target ratio 146) or 0.95 (e.g., within 5% of the target ratio 146).

Thus, an embedded controller may determine the ambient light associated with a first (e.g., master) display device, determine a first current being drawn (e.g., consumed) by the backlight LEDs of the first display device, and adjust the first current to compensate for the ambient light. For example, if the first display device is receiving more than a predetermined ("normal") amount of ambient light, the embedded controller may increase the amount of current being provided to the backlight LEDs. If the first display device is receiving less than a predetermined ("normal") amount of ambient light, the embedded controller may decrease the amount of current being provided to the backlight LEDs. For example, the current may be adjusted (e.g., increased/decreased) by adjusting (e.g., increasing/decreasing) the duty cycle of a square wave (e.g., PWM) of a circuit providing power to the backlight LEDs.

The embedded controller may determine the ambient light associated with a secondary display device, determine a second current being drawn by the backlight LEDs of the second display device, and determine a current ratio of the perceived brightness of the first display device as compared to the perceived brightness of the second display device. The perceived brightness may be determined based on (1) the current being drawn by the backlight LEDs of each display device and (2) the ALS data associated with each display device. The current ratio may be compared with a target ratio. If the current ratio differs from the target ratio by more than a predetermined amount (or percentage), the embedded controller may repeatedly and incrementally adjust the current being supplied to the backlight LEDs of the secondary display device and recalculate the current ratio until the current ratio differs from the target ratio by no more than the predetermined amount (or percentage).

FIG. 9 is a flowchart of a process 900 that includes determining a brightness ratio of two display devices according to some embodiments. The process 900 may be performed by one or more components, such as the embedded controller 114, of the computing device 102 of FIG. 1.

At 902, data associated with a master display device may be read. At 904, a brightness adjustment for the master display device may be determined. At 906, a brightness of the master display device may be adjusted. For example, in FIG. 1, the embedded controller 114 may read the first ALS data 132 from the first ambient light sensor 128 associated with the first display device 110 and may determine the first current 136 being drawn by the backlight LEDs 116 associated with the first display device 110. In some cases, the embedded controller 114 may read one or more temperature sensors associated with the first display device 110 to determine a temperature associated with the first display device 110. For example, the display devices 110, 112 may use a type of technology that causes characteristics, such as brightness, of the display devices 110, 112 to vary based on temperature. For example, heat build-up due to components (e.g., processor, memory, battery, or the like) placed behind one or both of the display devices 110, 112 may cause one of the display devices to have a temperature that is different from the other of the display devices. As another example, one of the display devices 110, 112 may be in direct sunlight or below a heat register, causing it to have an increased temperature as compared to the other of the display devices. In some cases, the temperature difference between the display devices 110, 112 may be sufficient to cause differences in brightness. The embedded controller 114 may take the temperature differences between the display devices 110, 112 into consideration when determining the current ratio 144 and when adjusting the brightness of the second display device 112 to match the brightness of the first display device 110. The embedded controller 114 may adjust the brightness of the first display device 110 by adjusting the first PWM 148 (e.g., adjusting a duty cycle of a square wave) based on the first ALS data 132 and the first current 136.

At 908, a master current associated with the master display device may be measured and a secondary current associated with the secondary display device may be measured. At 910, one or more master sensors (e.g., ALS sensors, temperature sensors, and the like) associated with the master display device may be measured and one or more secondary sensors associated with the secondary display device may be measured. For example, in FIG. 1, the embedded controller 114 may use the first current monitoring circuit 124 to determine the first current 136 associated with the first display device 110 and use the first ambient light sensors 128 to determine the first ALS data 132. The embedded controller 114 may use the second current monitoring circuit 126 to determine the second current 138 associated with the second display device 112 and use the second ambient light sensors 130 to determine the second ALS data 134. In some cases, the embedded controller 114 may read one or more master temperature sensors to determine a master temperature associated with the master display device and may read one or more secondary temperature sensors to determine a secondary temperature associated with the secondary display device.

At 912, a brightness ratio comparing (1) the brightness of the master display device relative to (2) the brightness of the secondary display device may be calculated. At 914, a determination may be made whether the brightness ratio satisfies a target ratio. The brightness ratio may be calculated in different ways. In response to determining, at 914, that "yes" the brightness ratio satisfies the target ratio, the process proceeds to 902.

See the description of FIG. 8 for one example of how the brightness ratio may be determined. Another example of how the brightness ratio may be determined and adjusted is described below.

$$\text{Master\_to\_Slave\_Ratio} = (\text{Current}_{Master}/\text{ALS\_Adj}_{Master})/(\text{Current}_{Slave}/\text{ALS\_Adj}_{Slave})$$

Where:
Master_to_Slave_Ratio=current ratio 144
$\text{Current}_{Master}$=First Current 136,
$\text{Current}_{Slave}$=Second Current 138,
$\text{ALS\_Adj}_{Master}$=an adjustment for ambient light based on first ALS Data 132, and
$\text{ALS\_Adj}_{Slave}$=an adjustment for ambient light based on second ALS Data 134.

In some cases, ($\text{Current}_{Master}/\text{ALS\_Adj}_{Master}$) may be multiplied by a first temperature adjustment based on a first temperature of the first display device and ($\text{Current}_{Slave}/\text{ALS\_Adj}_{Slave}$) may be multiplied by a second temperature adjustment based on a second temperature of the second display device.

The ALS_Adj (ALS adjustment) may take into account that current may be higher when the ambient light (e.g., ALS data) for a display device is relatively high (e.g., more current means a brighter backlight to compensate for a greater amount of ambient light), and the current for a display device may be lower when ALS data is relatively low (e.g., less current means a dimmer backlight when there is a lower amount of ambient light). For example, assume the current 136, 138 can range (or can be scaled to range) between 0 and 100 milliamperes (mA), the ALS data 132, 134 is measured and scaled to have a value between 0

(minimum ambient light, e.g., darkness) and 100 (maximum ambient light, e.g., direct sunlight). Assume both display devices 110, 112 are set to the same brightness (e.g., without taking into account ambient light), e.g., first current 136=50 mA=second current 138. Assume that the computing device 102 is placed in the clamshell orientation 408(1), with the first display 110 receiving more ambient light than the second display 112, e.g., the ALS data 132=60 and ALS data 134=40. The embedded controller 114 may determine:

Master_to_slave_ratio=(50/60)/(50/40)=0.83/1.25=0.67

The 50/60 ratio indicates that the first (e.g., master) display device 110 appears less bright than the second display device 112 because the first display 110 is receiving more ambient light than the second display 112. The embedded controller 114 may first adjust the first display device 110 to account for the ambient light (e.g., the first ALS data 132). For example, the embedded controller 114 may use a formula to increase the first current 136 to achieve a target brightness of the first display device 110 based on the ambient light (the first ALS data 132), e.g., first current 136/first ALS data 132>=N, where N=1. Assume the embedded controller 114 increases the first current 136 from 50 to 60 to compensate for the higher ambient light:

Master_to_slave_ratio=(60/60)/(50/40)=1.0/1.25=0.80

The embedded controller 114 may adjust the second PWM 150 until the brightness of the backlight LEDs 118, under the corresponding ambient light (e.g. as measured by the second ALS data 134), is within a threshold of the brightness of the backlight LEDs 116, under the corresponding ambient light (e.g. as measured by the first ALS data 132). For example, the embedded controller 114 may repeatedly decrement the second current 138 from 50 to 40 to reach within a threshold of the target ratio 146:

Master_to_slave_ratio=(60/60)/(40/40)=1.0

Thus, the embedded controller 114 adjusts the current ratio 144 to be within a predetermined amount of (or equal to) the target ratio 146. Of course, other techniques for determining and adjusting the ratio may be used. If the computing device includes more than two display devices, the ratio of the master display device to each secondary display device may be determined and the current of each secondary display device adjusted to match the brightness of the master display device.

In response to determining, at 914, that "no" the brightness ratio does not satisfy (e.g., is not within a predetermined amount of) the target ratio, the process proceeds to 916, where the brightness of the secondary display device is adjusted. The process 800 then proceeds to 918 where the secondary current associated with the secondary display device is measured. The process 900 may repeat 912, 914, 916, 918 until, at 814, the brightness ratio is determined to satisfy (e.g., is within a predetermined amount of) the target ratio. For example, if the current ratio is 1.10, indicating that the first display device 110 is about 10% brighter than the second display device 112, the embedded controller 114 may repeatedly and incrementally (e.g., by 0.01) increase the second PWM 150 to increase the second current 138 until the current ratio 144 is 1.02 (e.g., within 2% of the target ratio 146) or 1.05 (e.g., within 5% of the target ratio 146). If the current ratio is 0.90, indicating that the first display device 110 is about 90% as bright as the second display device 112, the embedded controller 114 may repeatedly and incrementally (e.g., by 0.01) decrease the second PWM 150 to decrease the second current 138 until the current ratio 144 is 0.98 (e.g., within 2% of the target ratio 146) or 0.95 (e.g., within 5% of the target ratio 146).

Thus, an embedded controller may determine the ambient light associated with a first (e.g., master) display device, determine a first current being drawn (e.g., consumed) by the backlight LEDs of the first display device, and adjust the first current to compensate for the ambient light. For example, if the first display device is receiving more than a predetermined ("normal") amount of ambient light, the embedded controller may increase the amount of current being provided to the backlight LEDs. If the first display device is receiving less than a predetermined ("normal") amount of ambient light, the embedded controller may decrease the amount of current being provided to the backlight LEDs. For example, the current may be adjusted (e.g., increased/decreased) by adjusting (e.g., increasing/decreasing) the duty cycle of a square wave (e.g., PWM) of a circuit providing power to the backlight LEDs.

The embedded controller may determine the ambient light associated with a secondary display device, determine a second current being drawn by the backlight LEDs of the second display device, and determine a current ratio of the perceived brightness of the first display device as compared to the perceived brightness of the second display device. The perceived brightness may be determined based on (1) the current being drawn by the backlight LEDs of each display device and (2) the ALS data associated with each display device. The current ratio may be compared with a target ratio. If the current ratio differs from the target ratio by more than a predetermined amount (or percentage), the embedded controller may repeatedly and incrementally adjust the current being supplied to the backlight LEDs of the secondary display device and recalculate the current ratio until the current ratio differs from the target ratio by no more than the predetermined amount (or percentage).

Figure 10:
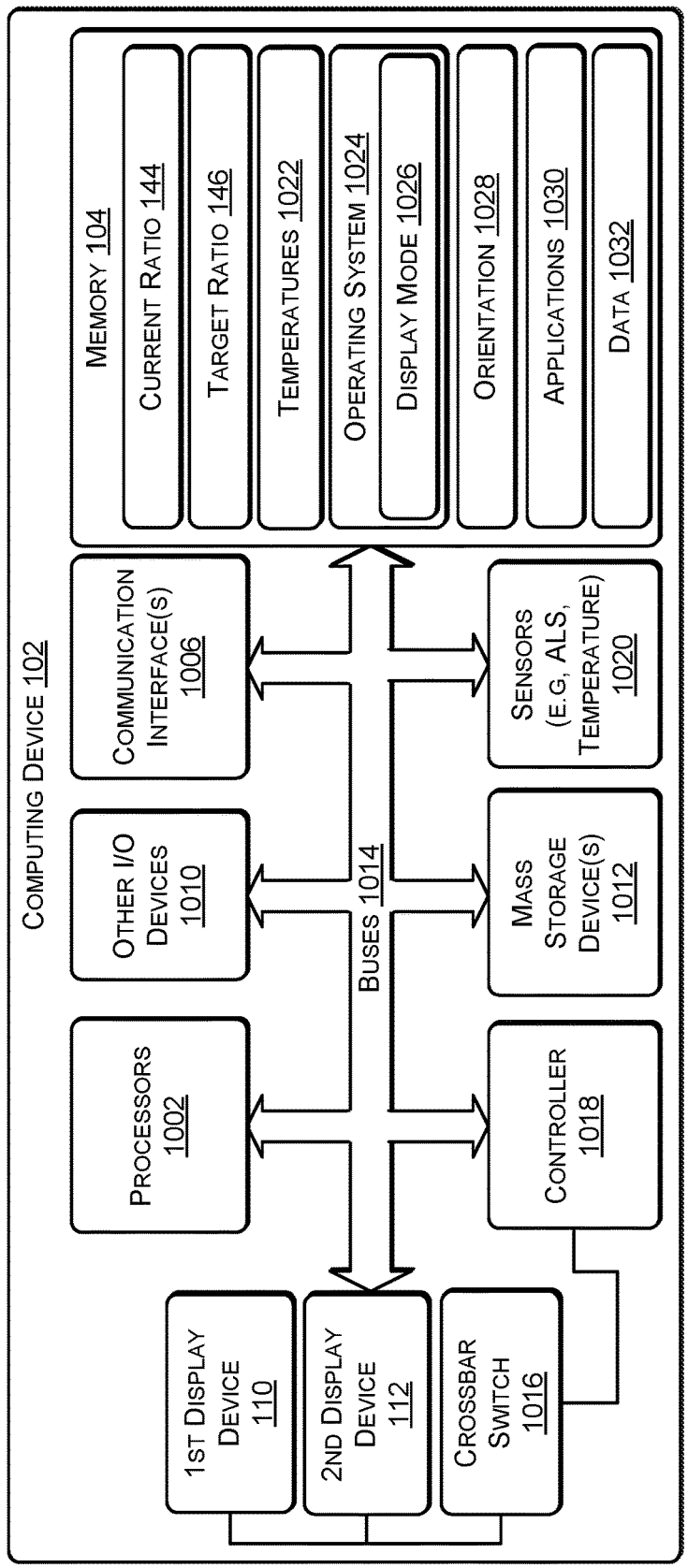
FIG. 10 illustrates an example configuration of a computing device that can be used to implement the systems and techniques described herein.

FIG. 10 illustrates an example configuration of the computing device 102 of FIGS. 1, 2, 3, 4, 5, 6, and 7 that can be used to implement the systems and techniques described herein. The computing device 102 may include one or more processors 1002 (e.g., the CPU 106 and the GPU 108 of FIG. 1), memory 104, communication interfaces 1006, the display devices 110, 112, other input/output (I/O) devices 1010, and one or more mass storage devices 1012, configured to communicate with each other, such as via one or more system buses 1014 or other suitable connection. While a single bus 1014 is illustrated for ease of understanding, it should be understood that the system buses 1014 may include multiple buses, such as memory device buses, storage device buses, power buses, video signal buses, and the like.

The processors 1002 are one or more hardware devices that may include a single processing unit or a number of processing units, all of which may include single or multiple computing units or multiple cores. The processors 1002 may include an integrated GPU or the GPU a separate processor device. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of non-transitory computer media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be a media capable of storing computer-readable, processor-executable program instructions as computer program code that can be executed by the processor 1002 as a particular machine configured for carrying out the operations and functions described in the implementations herein.

The computing device 102 may also include one or more communication interfaces 1006 for exchanging data via a network with other computing devices. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like. The display devices 110, 112 may be connected to each other using a hinge (e.g., the hinge 206 of FIG. 2) that enables each of the display devices 110, 112 to rotate relative to the other display device. The display devices 110, 112 may be used for displaying information and images to users. Other I/O devices 1010 may be devices that receive various inputs from a user and provide various outputs to the user, and may include a stylus (e.g., to receive touch input in the touchscreens of the display devices 110, 112, a keyboard, a remote controller, a mouse, a printer, audio input/output devices, and so forth. A controller 1018 may select a particular video signal routing configuration of a crossbar switch 1016. For example, the routings may select whether an output of an embedded DisplayPort (eDP) is sent to one or both display devices 110, 112 and whether an output of a DisplayPort (DP) is sent to one or both display devices 110, 112. The computing device 102 may include one or more sensors 1020, such as, for example, temperature sensors associated with each of the display devices 110, 112, the ambient light sensors 128, 130, an accelerometer, a gyroscope, a magnetometer or a magnetic compass, a proximity sensor, a camera, or another type of sensor.

The computer storage media, such as memory 1004 and mass storage devices 1012, may be used to store software and data. For example, the computer storage media may be used to store temperatures 1022 (e.g., associated with each of the display devices 110, 112), an operating system 1024, a display mode 1026, an orientation module 1028 of the computing device 102, one or more software applications 1030, and data 1032. The operating system 1022 may have the associated display mode 1026. For example, the operating system 132, such as Microsoft® Windows®, may provide three display modes 1026: (a) extended desktop mode where the display devices 110, 112 behave as a single display device (e.g., the second display device 112 acts as an extension of the first display device 110), (b) clone mode where each of the display devices 110, 112 each display the same content, or (c) single display mode in which one of the display devices 110, 112 is off or blank and therefore not displaying any content.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a computing device comprising a first display device and a second display device, a first amount of ambient light associated with the first display device;
   determining, by the computing device, a first current associated with the first display device;
   determining, by the computing device, a second amount of ambient light associated with the second display device;
   determining, by the computing device, a second current associated with the second display device;
   determining, by the computing device, a first perceived brightness associated with the first display device based on the first current and the first amount of ambient light;

determining, by the computing device, a second perceived brightness associated with the second display device based on the second current and the second amount of ambient light;

determining, by the computing device, a first ratio of the first perceived brightness of the first display device to the second perceived brightness of the second display device; and modifying, by the computing device and based at least in part on the first ratio, the second current to create a second modified amount of current associated with the second display device, wherein the second modified amount of current modifies the second perceived brightness of the second display device to create a modified second perceived brightness of the second display device.

2. The method of claim 1, further comprising:
determining a second ratio of the first perceived brightness of the first display device to the modified second perceived brightness of the second display device.

3. The method of claim 2, further comprising:
determining that the second ratio differs from a target ratio by less than a predetermined amount.

4. The method of claim 2, further comprising:
determining that the second ratio differs from a target ratio by at least a predetermined amount; and
modifying the second modified amount of current to create a third modified amount of current.

5. The method of claim 1, wherein modifying the second current to create the second modified amount of current comprises:
modifying a duty cycle of a square wave providing power to a backlight of the second display device.

6. The method of claim 1, wherein:
increasing the second current to create the second modified amount of current increases the modified second perceived brightness of the second display device.

7. The method of claim 1, wherein:
decreasing the second current to create the second modified amount of current decreases the modified second perceived brightness of the second display device.

8. A computing device comprising:
a first display device;
a second display device;
an embedded controller configured with logic instructions to perform operations comprising:
determining a first amount of ambient light associated with the first display device;
determining a first current associated with the first display device;
determining a second amount of ambient light associated with the second display device;
determining a second current associated with the second display device;
determining a first perceived brightness associated with the first display device based on the first current and the first amount of ambient light;
determining a second perceived brightness associated with the second display device based on the second current and the second amount of ambient light;
determining a first ratio of the first perceived brightness of the first display device to the second perceived brightness of the second display device; and
modifying, based at least in part on the first ratio, the second current to create a second modified amount of current associated with the second display device, wherein the second modified amount of current modifies the second perceived brightness of the second display device to create a modified second perceived brightness of the second display device.

9. The computing device of claim 8, further comprising:
a first ambient light sensor to measure the first amount of ambient light associated with the first display device; and
a second ambient light sensor to measure the second amount of ambient light associated with the second display device.

10. The computing device of claim 8, further comprising:
a first backlight driver circuit to provide the first current to a first set of light emitting diodes (LEDs) associated with the first display device; and
a second backlight driver circuit to provide the second current to a second set of light emitting diodes (LEDs) associated with the second display device.

11. The computing device of claim 8, further comprising:
a first set of temperature sensors to determine a first temperature associated with the first display device; and
a second set of temperature sensors to determine a second temperature associated with the second display device.

12. The computing device of claim 11, the operations further comprising:
determining the first ratio based at least in part on the first temperature and the second temperature.

13. The computing device of claim 8, the operations further comprising:
determining a second ratio of the first perceived brightness of the first display device to the modified second perceived brightness of the second display device;
determining that the second ratio differs from a target ratio by at least a predetermined amount; and
modifying the second modified amount of current to create a third modified amount of current.

14. One or more non-transitory computer-readable storage media to store instructions executable by a computing device to perform operations comprising:
determining a first amount of ambient light associated with a first display device of the computing device;
determining a first current associated with the first display device;
determining a second amount of ambient light associated with a second display device of the computing device;
determining a second current associated with the second display device;
determining a first perceived brightness associated with the first display device based on the first current and the first amount of ambient light;
determining a second perceived brightness associated with the second display device based on the second current and the second amount of ambient light;
determining a first ratio of the first perceived brightness of the first display device to the second perceived brightness of the second display device; and
modifying, based at least in part on the first ratio, the second current to create a second modified amount of current associated with the second display device, wherein the second modified amount of current modifies the second perceived brightness of the second display device to create a modified perceived brightness of the second display device.

15. The one or more non-transitory computer-readable storage media of claim 14 wherein:

a first backlight driver circuit provides the first current to a first set of light emitting diodes (LEDs) associated with the first display device; and a second backlight driver circuit provides the second current to a second set of light emitting diodes (LEDs) associated with the second display device.

16. The one or more non-transitory computer-readable storage media of claim 14, the operations further comprising:

determining a third current associated with a third display device of the computing device;

determining a third ratio of the first perceived brightness of the first display device to a third perceived brightness of the third display device; and modifying the third current to create a third modified amount of current.

17. The one or more non-transitory computer-readable storage media of claim 14, the operations further comprising:

determining a second ratio of the first perceived brightness of the first display device to the second perceived brightness of the second display device;

determining that the second ratio differs from a target ratio by at least a predetermined amount; and modifying the second modified amount of current to create a third modified amount of current.

18. The one or more non-transitory computer-readable storage media of claim 14, the operations further comprising:

determining, using a first brightness sensor, a first brightness associated with the first display device; and determining, using a second brightness sensor, a second brightness associated with the second display device.

19. The one or more non-transitory computer-readable storage media of claim 14, the operations further comprising:

determining an orientation of the computing device; and determining a display mode of the computing device.

20. The one or more non-transitory computer-readable storage media of claim 14, the operations further comprising:

sending an instruction to a backlight driver associated with the second display device to create the second modified amount of current, wherein the instruction is sent via an inter-integrated circuit (I2C) bus.

* * * * *